United States Patent
James et al.

(10) Patent No.: US 7,418,398 B2
(45) Date of Patent: *Aug. 26, 2008

(54) STORED VALUE CARDS AND METHODS FOR THEIR ISSUANCE

(75) Inventors: Kevin A. James, Waynesville, NC (US); Peter A. Pridgeon, Plantation, FL (US); David L. Cox, Parkland, FL (US); Ryan G. Teixeria, Coral Springs, FL (US)

(73) Assignee: First Data Corporation, Greenwood Village, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/433,144

(22) Filed: May 10, 2006

(65) Prior Publication Data

US 2006/0206436 A1    Sep. 14, 2006

Related U.S. Application Data

(63) Continuation of application No. 09/971,303, filed on Oct. 3, 2001, now Pat. No. 7,054,842.

(51) Int. Cl.
*G06F 17/60* (2006.01)

(52) U.S. Cl. .............................. 705/1; 705/39; 705/64; 705/67; 705/71; 705/74

(58) Field of Classification Search .................... 705/1, 705/39, 64, 67, 71, 74
See application file for complete search history.

(56) References Cited

U.S. PATENT DOCUMENTS

| | | | | |
|---|---|---|---|---|
| 5,883,810 | A * | 3/1999 | Franklin et al. | 700/232 |
| 2001/0047330 | A1 * | 11/2001 | Gephart et al. | 705/39 |
| 2002/0035548 | A1 * | 3/2002 | Hogan et al. | 705/64 |
| 2002/0038287 | A1 * | 3/2002 | Villaret et al. | 705/41 |
| 2002/0120584 | A1 * | 8/2002 | Hogan et al. | 705/67 |

FOREIGN PATENT DOCUMENTS

JP    2004127029 A  *  4/2004

* cited by examiner

*Primary Examiner*—Pierre Eddy Elisca
(74) *Attorney, Agent, or Firm*—Townsend and Townsend and Crew LLP

(57) ABSTRACT

A method for issuing both a virtual card and a physical card to a cardholder comprises issuing a virtual card to a cardholder, with the virtual card comprising an identifier and an associated database record of a stored value. A physical card is also issued to the cardholder. The physical card includes an identifier that is different from the virtual card identifier, and the physical card is in an inactive state until the physical card is activated by linking of the physical card identifier to the database record of the stored value.

19 Claims, 2 Drawing Sheets

STORED VALUE CARDS AND METHODS FOR THEIR ISSUANCE

CROSS-REFERENCES TO RELATED APPLICATIONS

This application is a continuation of Application No. 09/971,303, filed on Oct. 3, 2001, now U.S. Pat. No. 7,054,842, the disclosure which is herein incorporated by reference.

BACKGROUND OF THE INVENTION

This invention relates generally to the field of stored value cards, and in particular to the issuing of such cards. More specifically, the invention relates to systems and methods for issuing cards of different types that share the same stored value record.

The concept of stored value allows something of value, such as cash, points, phone time, and the like to be placed on a delivery instrument. Examples in the retail world include gift certificates, merchandise credits, loyalty cards, membership cards, and even simple punch cards.

Traditionally, most stored value products have been paper-based. Although workable, paper documents bring with them a host of issues, including special sales and redemption procedures, lengthy transaction times, security issues, financial reporting issues and the like. Current technology now permits the conversion of these paper products to an electronic product, enabling businesses to operate more efficiently and to provide better customer service. More specifically, such cards are easy to use and handle and can be easily processed via existing point-of-sale equipment. Further, there is no manual handling of paper-based cash substitutes. Such cards can move transactions faster because there is no need to count and collect cash or manually process paper-based gift certificates or merchandise credits. Such cards are also accurate and secure transactions are processed in seconds. Other advantages of such cards is that they are safe and provide cost-savings. Such cards can substantially reduce cash handling costs as well as reduce the potential for employee loss or theft since every transaction is tracked electronically on a central database. Further, such cards may increase sales and customer loyalty and may produce new revenue streams.

Consumer acceptance of such cards is becoming more widespread. Such acceptance may be because such cards are convenient to use and reduce the need to carry currency, gift certificates, merchandise credits or coupons. Further, these are small, easy to carry and use. Another advantage is that such cards are fast to use. The actual transaction time is typically faster than that for a credit or debit transaction and much quicker than the manual handling of gift certificates or merchandise credits. In addition, there is no change to count or handle. Such cards are also safe by reducing the amount of cash customers must carry. These cards may also be pre-paid for a set value so as to be self limiting.

The traditional type of stored value card is a "brick-to brick" card that is purchased in-store and is usable in-store (a physical-only usage). However, with the advent of the Internet, other types of stored value cards have become available. These include brick-to-click cards that are bought in-store and usable in-store as well as on the web; click-to-click cards that are bought on the web and used only on the web (a virtual-only usage); and click-to brick cards that are bought on the web and used on the web or in-store.

This invention relates to ways to issue such cards to cardholders. More specifically, the invention relates to the issuing of different types of stored value cards, where all of the cards are tied to a single stored value record.

BRIEF SUMMARY OF THE INVENTION

In one embodiment, a method for issuing both a virtual card and a physical card to a cardholder is provided. According to the method, a virtual card is issued to a cardholder that comprises a unique identifier and an associated database record of a stored value for the virtual card. A physical card is also issued to the cardholder, with the physical card having a unique identifier that is different from the virtual card identifier. In this way, the physical card does not need to be produced at the same time as the issuing of the virtual card, thereby reducing costs. The physical card is kept in an inactive state, i.e., it is unable to be used to make purchases, until the physical card is activated by linking of the physical card identifier to the database record of the stored value. In this way, the physical card may be shipped to the cardholder in an inactive state. Upon receipt of the physical card, the cardholder simply makes a request to active the physical card. After this request, the linking occurs by fashioning both the physical card identifier and the virtual card identifier as pointers to the same stored value record. Advantageously, the virtual card is immediately usable upon issuance so that purchases may be made with the virtual card while the physical card is being shipped. Once the linking occurs, the record to which the physical card identifier and the virtual card identifier point maintains one consistent available balance.

In one aspect, one or more validation checks may be made prior to the linking of the physical card to the record of the stored value. For instance, the virtual card may further comprise a personal identification number (PIN) that is stored in the database, and the physical card may further comprise a personal identification number (PIN) that is stored in the database. The validation check may then comprise the step of comparing the physical card PIN and the virtual card PIN with corresponding PINs provided by the cardholder. The physical card will only be validated and linking will only occur if both of the PINs provided by the cardholder match the PINs stored in the database. Another validation check comprises querying the database to determine if the virtual card is both valid and active. A further validation check comprises querying the database to determine if the physical card is valid and in the inactive state.

The invention also provides a computerized system for linking a virtual card with a physical card. The system includes a physical card having an identifier as well as a processing system and an associated database. The database has a record of a stored value and additional behavioral attributes, a virtual card identifier that comprises a pointer to the stored value record, and the physical card identifier. The processing system is configured to link the physical card identifier and the virtual card identifier to the same stored value record, and once linked to allow access to the stored value record using either card identifier.

In one aspect, the processing system is further configured to link the physical card identifier to the stored value record after receipt of the physical card by the cardholder and upon a request by the cardholder to activate the physical card by giving the physical card identifier. In a further aspect, the processing system may be further configured to perform validation checks prior to the linking. These checks may include a comparison of PINs, and querying of the database to determine if the virtual card is both valid and active, and that the physical card is both valid and in the inactive state.

DETAILED DESCRIPTION OF THE INVENTION

Figure 1:
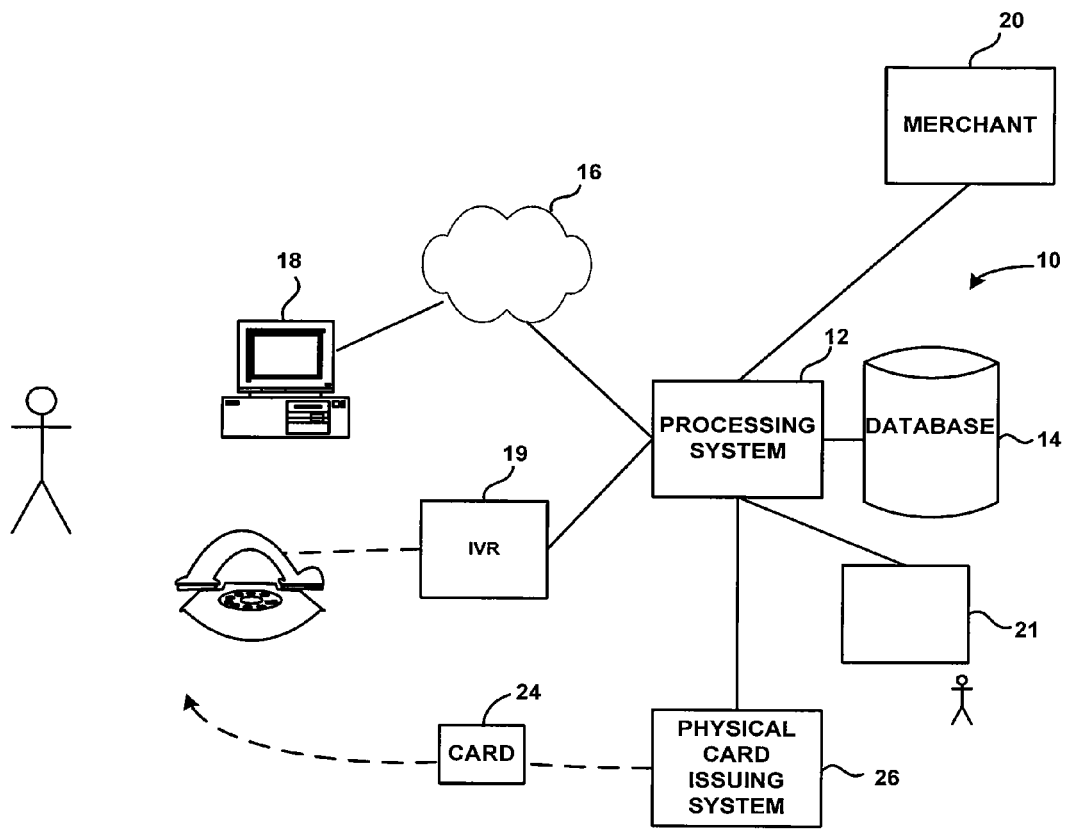
FIG. 1 is a schematic diagram of a system for issuing stored value cards of different types that share the same stored value record according to the invention.

The invention provides systems and techniques for issuing cards of different types that are to be used with the same record. In one aspect, the invention provides for the issuance of a stored value card that is to be used as an electronic, non-physical or virtual card. The virtual card is immediately active and usable by the recipient wherever that virtual card is accepted. The invention further provides for the issuing and shipment of a physical stored value card to the recipient. The physical card is shipped in an inactive and unusable state and remains so until activated by the rightful recipient. Once activated, the physical card shares all the attributes with the originally issued virtual card and is usable in "brick-and-mortar" locations where that card is accepted as well as continuing to be usable in the same locations where the predecessor virtual card is accepted.

As one example, upon issuing of the virtual card, that card may be used to make web purchases. Once the physical card is received and activated it may also be used to make web purchases as well as purchases in physical stores. When the cards are used, the same stored value record that is shared by both cards is updated. For example, when making a purchase using either card, the merchant transmits information about the cards, such as their identification number (and optionally a PIN), to a processing center that handles the record. The processing center accesses a database that has pointers from both cards to the same record. The balance associated with that record is then debited for the transaction amount.

Hence, once the physical card is activated, the physical card is essentially linked to the virtual card. This allows for the sharing of behavioral attributes and characteristics between the physical card and the virtual card that it is linked to, including any balance remaining on the virtual card at the time it is linked.

Such an approach provides significant advantages. For example, once the virtual card is created and electronically issued with specific attributes, its attributed balance is immediately usable. Once linked, the associated physical card also has the same attributes, e.g., the correct balance, expiration date, min and max attributes, and the like. However, by sending the physical card in the inactive state prior to linking, it is less susceptible to be received or intercepted by someone other than the rightful recipient. Once the physical card is activated and linked, its attributes are the same as the virtual card. Such linking of the two cards thereby permits the two cards to have separate identifiers. In this way, the two identifiers do not have to be matched at the time of manufacture or issuance, thereby reducing costs and potential errors. Further, the physical card may be left inactive or "dead" while shipped in the mail. It is therefore unavailable for use until activation by the rightful recipient. Still further, the physical card may only be activated by a person with an already active valid virtual card, at which time the activation event links the physical card to the virtual card, so no risk of theft or loss is present.

Further, it will be appreciated that the same process may be used if the physical card is first issued, followed by the virtual card. In such cases, the virtual card is inactive and unusable until activated by the recipient. Once activated, the virtual card identifier and the physical card identifier relate to the same stored value record in a manner similar to that described herein.

Referring now to FIG. 1, one embodiment of a system 10 that may be used to issue such cards will be described. System 10 comprises a processing system 12 and an associated database 14. Database 14 is preferably a relational database, such as an Oracle database, that contains records on various stored value records. This information may include, for example, types of cards (physical or virtual), identifiers, PINs, record balances, minimums and maximums, merchant information and the like. Processing system 12 may be a Sun Microsystems workstation, and works in cooperation with database 14 to permit information to be updated, to permit cards to be issued, to permit transactions to occur and the like.

Processing system 12 may receive information from a variety of sources. For example, processing system 12 may be accessed through the Internet 16 by any type of computer 18 as is known in the art. Other ways to access processing system 12 include the use of an Interactive Voice Response unit (IVR) 19, through a customer service representative, by using a help desk 21 or the like.

Once an appropriate connection is made, a virtual stored value card may be issued. As one example, a user may use computer 18 to access the web site of a merchant who offers for sale virtual cards. Information, such as payment type, requested value and the like may be gathered and then transmitted to processing system 12 that issues a virtual stored value card to the user. This may occur by giving the virtual card information to the web host in some sort of presentation, such as an e-mail, another web page, or the like. The virtual card typically includes both a unique identifier and a PIN. When this information is presented to a merchant (either on-line, by phone, in a physical store, or the like), the identifier, PIN and requested amount is sent to processing system 12 which validates the request and processes the transaction. In so doing, the balance of the card is debited for the transaction amount.

Processing system 12 may also be used to facilitate the issuing of a physical stored value card 24. This occurs in essentially the same way as the virtual card in that processing system 12 is accessed and provided with the necessary information to open a stored value record using any of the techniques previously described. This information is then sent to a physical card issuing system 26 that prints, stores on a pre-printed card or otherwise produces card 24 and sends it to the recipient as shown. Physical card 24 comprises some type of media that is capable of storing an identifier, such as an identification number, in human readable form, on a magnetic stripe, in a bar code, or the like. Also, a PIN may also be stored on card 24, preferably in a manner that is inaccessible without tampering with any packaging or defacing the card itself. Card 24 may optionally be used to make purchases on line simply by providing the identifier and PIN. It may also be used in a physical store simply by swiping card 24 through a point of sale device that transmits the information to processing system 12 as is known in the art.

Figure 2:
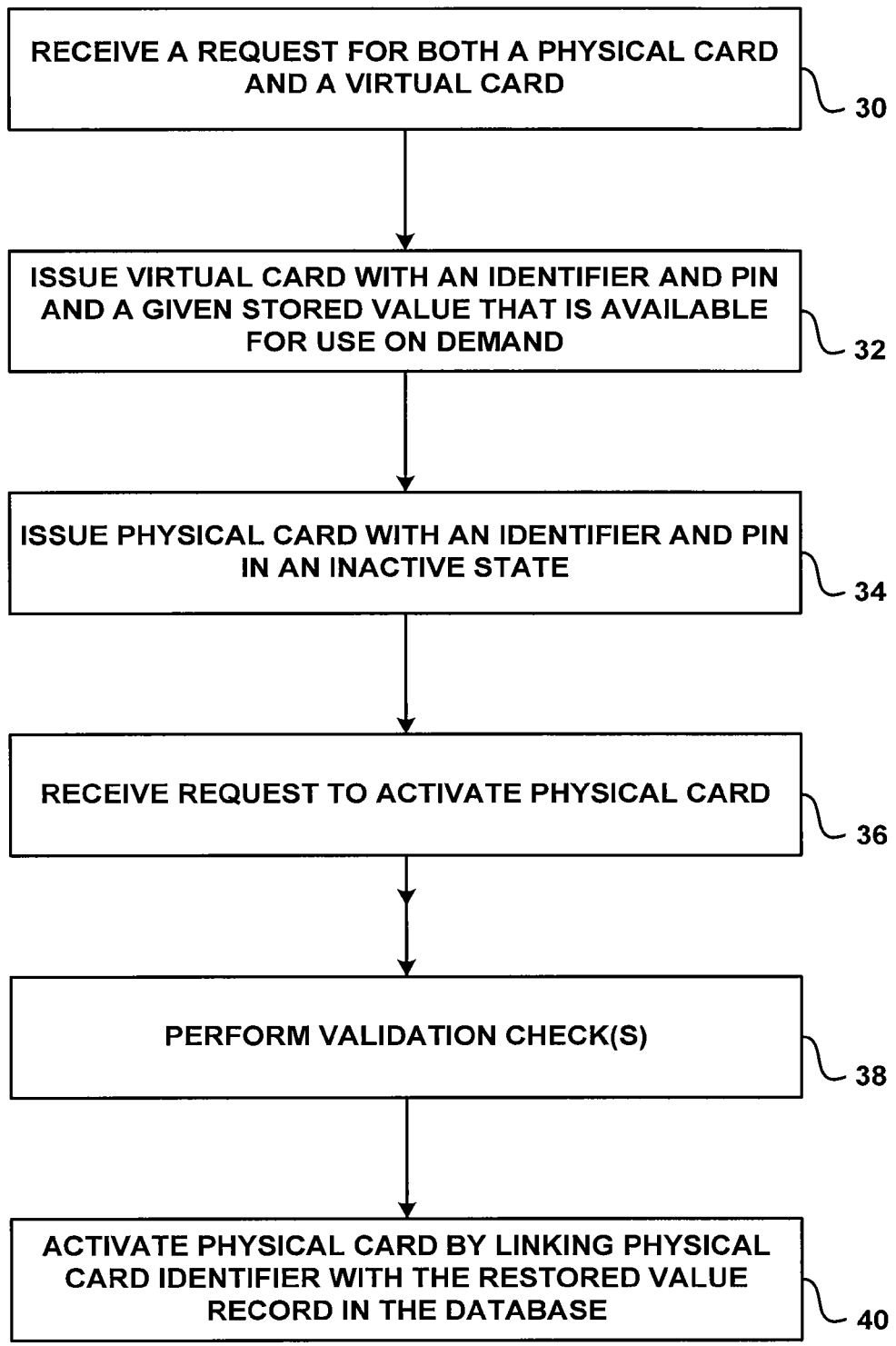
FIG. 2 is a flow chart illustrating one method for issuing stored value cards of different types to the same cardholder according to the invention.

If the user requests both a virtual card and a physical card for the same record, a process as set forth in FIG. 2 may be used. Initially, a request is received forth both a physical card and a virtual card as shown in step 30. This may be done by computer, IVR, by telephone, or the like. This information is sent to processing system 12 which issues a virtual card with an identifier and PIN along with an available stored value balance as shown in step 32. This information is stored in appropriate records within database 14, with the identifier serving as a pointer to the record containing the specific stored value parameters, including the balance.

Information is also sent from processing system 12 to the physical card issuing system 26 as shown in step 34. Card issuing system 26 generates a card (or selects an appropriate stock card) having the identifier and optionally the PIN. This is then mailed to the recipient in an inactive state. When the recipient receives physical card 24, the recipient contacts IVR 19, a customer service representative, accesses a web site, or the like to provide information on the identifier and PIN. This serves as a request to activate physical card 24 as shown in step 36.

At this point, several validation checks may be performed to insure the rightful recipient is requesting activation as shown in step 38. For example, the recipient may also be required to provide the identifier and PIN for the virtual card as well. The identifiers and PINs provided by the recipient are then compared against those stored in database 14 to see if they match. Another validation may be to query database 14 to insure that the virtual card is both valid and active. This may entail checking as to whether there is a valid merchant, a valid merchant location, or against other merchant criteria. A further check may be to query database 14 to make sure that physical card 24 is currently inactive. If card 24 is active, linking will be prevented.

If validated, the process proceeds to step 40 where the physical card is activated. This occurs by making the identifier for physical card 24 a second pointer to the record of the stored value. As such, the stored value of the physical card is the same as that of the virtual card. As such, if purchases have already been made using the virtual card, the balance of the physical card will be identical.

Once activated, both cards may be used while the same balance is debited or credited. For example, the identifier and optionally a PIN may be used to make web purchases. Both may also be used for in-store purchases. However, if a physical card is used, it may be swiped through a point of sale device that reads the identifier. As such, the PIN is not required.

The invention has now been described in detail for purposes of clarity and understanding. However, it will be appreciated that certain changes and modifications may be practiced within the scope of the appended claims.

What is claimed is:

1. A method for issuing both a non-physical virtual card and a physical card to a cardholder, wherein both the virtual card and the physical card is usable for conducting transactions against a funded value, the method comprising:

receiving at a processing system a request to receive both a physical card and a virtual card, along with a funded value that is associated with both the physical card and the virtual card;

using the processing system to first electronically issue a virtual card to a cardholder, the virtual card comprising an identifier and an associated database record of a stored value, wherein the virtual card is active upon issuance; and receiving at the processing system a request to debit the funded value by a redemption amount from an electronic purchase over a network;

debiting the funded value by the redemption amount;

sending a physical card to the cardholder, wherein the physical card includes a card body and an identifier that is different from the virtual card identifier, and wherein the physical card is in an inactive state until the physical card is activated by linking of the physical card identifier to the database record of the stored value, and wherein the funded value of the physical card is the funded value less the redemption amount.

2. A method as in claim 1, further comprising transmitting from the processing system to a physical card issuing system information used to issue the physical card to the cardholder, whereby once activated, the physical card shares attributes, including any unused funded value, with the virtual card.

3. A method as in claim 1, further comprising performing at least one validation check prior to linking to the record of the stored value.

4. A method as in claim 3, wherein the virtual card further comprises a first personal identification number (PIN) that is stored in the database, wherein the physical card further comprises a second personal identification number (PIN) that is stored in the database, and wherein a validation check comprises comparing the physical card PIN and the virtual card PIN with corresponding PINs provided by the cardholder.

5. A method as in claim 4, wherein the validation check comprises querying the database to determine if the virtual card is both valid and active.

6. A method as in claim 4, wherein the validation check further comprises querying the database to determine if the physical card is in the inactive state.

7. A method as in claim 1, wherein the linking step comprises providing two pointers in the database to the record of the stored value, and wherein the two pointers comprise the virtual card identifier and the physical card identifier.

8. A method for issuing both a non-physical virtual card and a physical card that are each usable for conducting transactions against the account of a cardholder, the method comprising:

receiving at a processing system a request to receive both a physical card and a virtual card, along with a funded value that is associated with both the physical card and the virtual card;

issuing a virtual card to a cardholder, the virtual card comprising an identifier and an associated database record of a stored value, wherein the virtual card is in an active state upon issuance;

receiving at a processing system a request to debit the funded value by a redemption amount from an electronic purchase over a network;

debiting the funded value by the redemption amount;

issuing a physical card to the cardholder, wherein the physical card is issued after the virtual card is issued and includes a card body and a physical card identifier, and wherein the physical card is in an inactive state;

receiving a request to activate the physical card, wherein the request includes the physical card identifier; and in response to the request, linking the physical card identifier to the database record of the stored value, with the stored value being previously debited by the redemption amount.

9. A method as in claim 8, wherein the physical card identifier is different from the virtual card identifier, and wherein the linking step comprises providing two pointers in the database to the record of the stored value, and wherein the two pointers comprise the virtual card identifier and the physical card identifier, whereby the virtual card is usable for transactions made by the cardholder prior to receipt and activation of the physical card, and whereby once activated, the physical card shares attributes, including any unused funded value, with the virtual card.

10. A method as in claim 9, further comprising performing a validation check prior to linking to the record of the stored value.

11. A method as in claim 10, wherein virtual card further comprises a personal identification number (PIN) that is stored in the database, wherein the physical card further comprises a personal identification number (PIN) that is stored in the database, wherein the request includes physical card and virtual card PINs, and wherein the validation check comprises comparing the physical card PIN and the virtual card PIN with the received PINs.

12. A method as in claim 10, wherein the validation check comprises querying the database to determine if the virtual card is both valid and active.

13. A method as in claim 10, wherein the validation check further comprises querying the database to determine if the physical card is both valid and in the inactive state.

14. A computerized system for linking a non-physical virtual card with a physical card for the same cardholder, the system comprising:

- a physical card comprising a card body having an identifier;
- a processing system; and
- a database having a record of a stored value, a virtual card identifier that is associated with the stored value record, and the physical card identifier;
- wherein the physical card is in an inactive state while the virtual card is in an active state;
- wherein the processing system is configured to receive a request to debit the stored value record by a redemption amount based on a purchase made over an electronic network using the virtual card identifier; and
- wherein the processing system is configured to link the physical card identifier to the stored value record after receipt of the physical card by a cardholder and to allow access to the stored value record using either card identifier once linked, thereby activating the physical card, with the stored value record being equal to the stored value less the redemption amount.

15. A system as in claim 14, wherein the virtual card identifier comprises a first pointer to the stored value record, wherein the processing system is configured to transmit to a physical card issuing system information used by the physical card issuing system to produce and issue the physical card upon receipt of a request to receive both the physical card and a virtual card that comprises the virtual card identifier, wherein the processing system is further configured to link the physical card identifier to the stored value record after receipt of the physical card by the cardholder and upon a request by the cardholder to activate the physical card, and wherein the request includes the physical card identifier, the physical card identifier comprising a second pointer to the stored value record, whereby the virtual card is usable for transactions made by the cardholder prior to receipt and activation of the physical card, and whereby once activated, the physical card shares attributes, including any stored value record, with the virtual card.

16. A system as in claim 15, wherein the processing system is further configured to perform a validation check prior to the linking.

17. A system as in claim 16, wherein database further includes a record of a virtual card personal identification number (PIN), wherein the physical card further comprises a personal identification number (PIN) that is stored in the database, and wherein the validation check comprises comparing the physical card PIN and the virtual card PIN in the database with corresponding PINs provided by the cardholder.

18. A system as in claim 16, wherein the validation check comprises querying the database with the processing system to determine if the virtual card is both valid and active.

19. A system as in claim 16, wherein the validation check further comprises querying the database with the processing system to determine if the physical card is in the inactive state.

* * * * *